United States Patent
Gioia et al.

[11] Patent Number: 5,248,920
[45] Date of Patent: Sep. 28, 1993

[54] CATHODE RAY TUBE DYNAMIC ELECTRON-OPTIC EYEBROW EFFECT DISTORTION CORRECTION

[75] Inventors: Norman F. Gioia, Lombard; Richard M. Gorski, Arlington Heights; Lionel A. Watson, Deerfield; Robert Adler, Northfield; Wayne R. Chiodi, Northbrook, all of Ill.

[73] Assignee: Zenith Electronics Corporation, Glenview, Ill.

[21] Appl. No.: 959,594

[22] Filed: Oct. 13, 1992

[51] Int. Cl.⁵ .................. H01J 29/70; H01J 29/76
[52] U.S. Cl. ..................... 315/368.26; 315/368.28
[58] Field of Search ............ 315/368.25, 368.26, 315/368.27, 368.28

[56] References Cited

U.S. PATENT DOCUMENTS

| | | | |
|---|---|---|---|
| 4,547,707 | 10/1985 | Yabase | 315/368 |
| 4,689,525 | 8/1987 | Shimoma et al. | 315/370 |
| 5,117,151 | 5/1992 | Sluyterman et al. | 313/413 |

FOREIGN PATENT DOCUMENTS 0218961 4/1987 European Pat. Off. .

Primary Examiner—Theodore M. Blum
Attorney, Agent, or Firm—Roland W. Norris

[57] ABSTRACT

In a color CRT with an in-line gun and a pin cushion correcting yoke, there is disclosed an eyebrow effect electronoptical distortion correction device comprising two pair of coils, each pair having a coil on each outer electron beam side of the neck in the plane of the beams. The coil pairs are spaced apart along the Z-axis between the gun and the yoke and are driven by a sawtooth current having a bow-tie envelope synchronous with the raster scan to correct the dynamic, antisymmetrical eyebrow effect apparent as a purity defect on the raster.

14 Claims, 4 Drawing Sheets

CATHODE RAY TUBE DYNAMIC ELECTRON-OPTIC EYEBROW EFFECT DISTORTION CORRECTION

BACKGROUND OF THE INVENTION

1. Field of the Invention

The present invention relates generally to electron-optic distortion phenomena in color CRTs. The present invention relates specifically to correction of an electron-optic distortion phenomenon resulting from use of a self-convergent (SC) deflection yoke having pin-cushion correction built into the yoke.

2. Discussion of the Related Art

In the art of color cathode ray tubes (CRTs) there are many known electron-optic distortions resulting from the imperfect deflection of the red, green, and blue electron beams as they are scanned across the phosphor screen by the deflection yoke. One such distortion particularly prevalent in CRTs having flattened or large radius faceplates is pincushion distortion where the four sides of the raster are curved inward. An example of such a CRT is the flat tension mask (FTM) computer monitor tube made by the assignee hereof.

Pincushion distortion can be corrected by proper distribution of the windings of the deflection yoke. However with reference to FIG. 1 this built-in correction causes a color purity distorting effect in a triad of electron beamlets passing through a common aperture in the shadow mask. This particular distortion is herein called "eyebrow effect". "Eyebrow effect" is the name given to the situation where the three in-line beamlets corresponding to red 29, green 32, and blue 33, designed to land substantially at a constant Y axis co-ordinate on the screen, instead exhibit a curved landing pattern with only the green beamlet 32 at the design coordinate and the red 29 and blue 33 beamlets lying in an arc above and below the desired Y-coordinate. The eyebrow effect is a dynamic effect, being largest in the corner regions and varying antisymetrically across the raster. It comes about because a pin cushion corrected yoke changes beam entry angles onto the mask. Color purity of the display is then compromised.

As seen in FIG. 2 the electron gun 11 located in the neck 13 of the CRT 15 emits three beams 17 coplanar in the X-Z plane. The beams 17 travel through a deflection yoke 19 where they are deflected to sweep across the screen 21. The beams hit a perforate parallax barrier or shadow mask 23, which passes a beamlet through the proper mask hole 25 to register the beamlet on the phosphor deposits (not shown) of the proper color luminescence to produce the desired display.

However, when a selfconverging yoke 19 has pin cushion distortion correction built-in, the yoke magnetic field displaces the outer beams, e.g. 47, changing their angle of incidence onto the mask so that they no longer arrive at the screen 21 on the same Y-axis coordinate as the center beam 51. This results in beamlet misregistration on the desired phosphor dot, causing the problems of color purity on the display seen in FIG. 1.

An unrelated electron-optic distortion called "rotation" or "twist" is caused by accidentally mounting an in-line three beam electron gun so that it is rotated about the tube axis within the CRT neck, or by the gun itself emitting "mis-aimed" beams. Rotation is a static phenomenon that gives rise to beam misconvergence on the face plate. Normally, such gun rotation would be corrected by a matching rotation of the yoke. This solution, however, rotates the raster with respect to the display unit escutcheon. U.S. Pat. No. 5,117,151, issued May 26, 1992 to Sluyterman et al., teaches the placing of permanent magnets around the neck of the CRT between the gun and the yoke to counterbalance the static rotation of the beams emitted from the gun before the beams reach the yoke, thus reducing or eliminating beam misconvergence without rotating the yoke.

The magnets of Sluyterman et al. deflect the displaced beams twice, so as to place them into the positions they would have occupied had the gun not been rotated. Therefore, the beams are properly placed within the yoke field, enabling the yoke to perform according to its design and to converge the beams properly.

In the eyebrow effect, the beams may remain converged on the screen, but through an unintended side effect of the pincushion correction built into the yoke windings, the yoke field displaces the outside, or red and blue, beam paths from their normal angle of incidence onto the mask, thereby misdirecting the beamlets which form as the beams pass through the mask holes, and misregistering the areas of impact of the beamlets on the phosphor deposits. As a result, color purity is compromised. Physical location of the phosphor dots could be changed to correspond to beamlet landings, yielding a small amount of eyebrow correction limited by the concurrent reduction of the phosphor dot guard bands.

It is an object of the present invention to dynamically correct eyebrow effect distortion by dynamic pre-yoke beam deflection. It is also an object of the present invention to perform this correction while maintaining beam convergence. The present invention has magnetic field generators placed between the gun and the yoke and energized synchronously with the beam scan to cancel the eyebrow effect distortion by dynamically predeflecting the beams so as to counterbalance the eyebrow effect induced by the yoke.

BRIEF DESCRIPTION OF THE DRAWINGS

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

DETAILED DESCRIPTION OF THE PREFERRED EMBODIMENT

Figure 1:
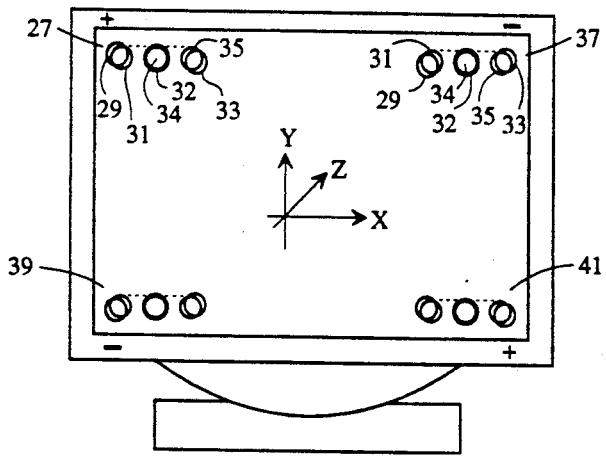
FIG. 1 is a front view of a known raster exhibiting eyebrow effect.
Figure 2:
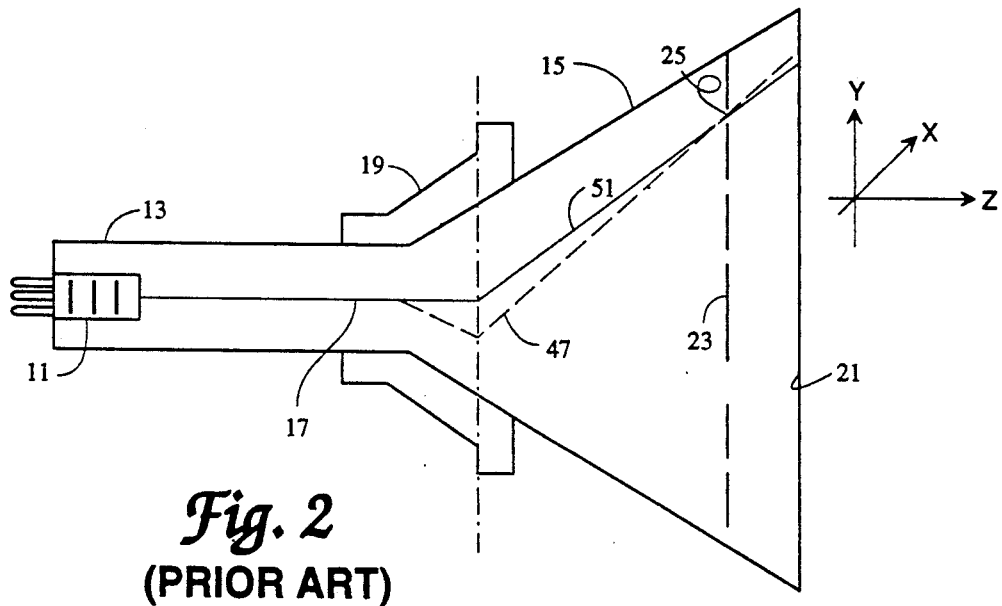
FIG. 2 is a cross-sectional side view of beam deflection by a known pincushion correcting yoke resulting in eyebrow effect.

FIG. 1 shows the dynamic antisymmetric nature of eyebrow effect. In the region near the top left corner 27 of the raster the red beamlet 29 lands higher than its associated phosphor dot 31 while the blue beamlet 33 lands lower than its associated phosphor dot 35. The green beamlet 32 lands as intended on its associated phosphor dot 34. This type of beamlet triad misregistration will be denominated positive. Near the top right corner 37 of the raster the red beamlet 29 is lower than the red phosphor dot 31 while the blue beamlet 33 is higher than the blue phosphor dot 35. This beamlet triad misregistration will be denominated negative. In the lower left corner region 39 of the raster the eyebrow effect is negative, while the lower right corner region 41 of the raster exhibits positive eyebrow effect.

Figure 3:
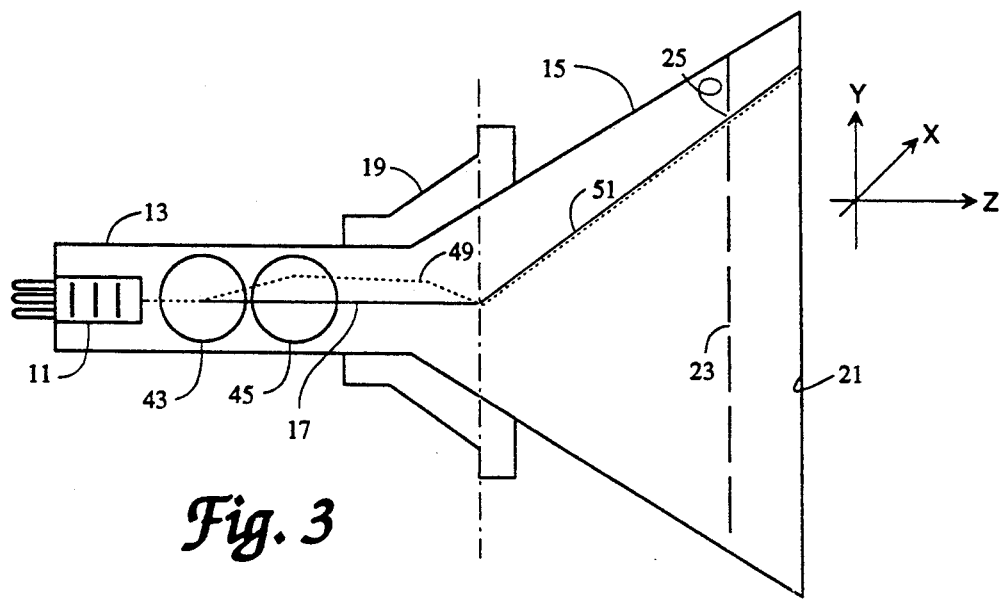
FIG. 3 is a cross-sectional side view of beam deflection within the CRT as eyebrow effect is corrected according to the present invention.
Figure 4:
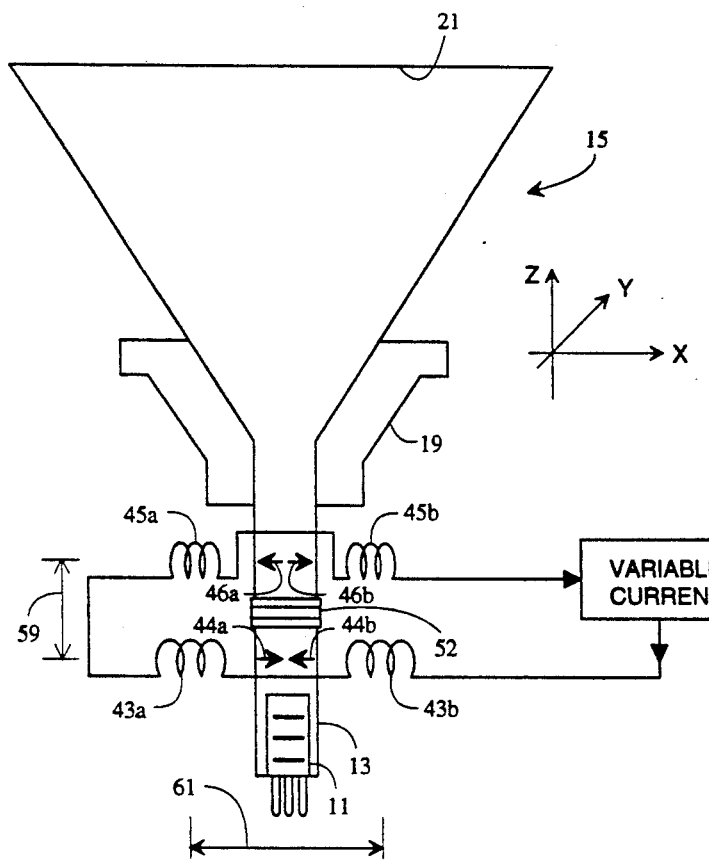
FIG. 4 is a top view of a CRT equipped according to the present invention.

As best seen in FIG. 4, two electrically conductive coil pairs 43, 45 comprising coils 43a, 43b; and 45a, 45b; respectively, are spaced apart in the plane of the beams and along the outside of the neck 13 of CRT 15 between the gun 11 and the yoke 19. The coil pairs 43, 45 located on the gun and yoke sides of the CRT, respectively, are placed between the electron gun 11 and the yoke 19 so as to deflect the path of one outer beam 47 first up and then down, as indicated in FIG. 3 by the dotted line 49, thereby placing the beam into a path where the yoke's pincushion displacement of the beam returns the outer beam path to a position substantially aligned with the unaffected center beam 51. Simultaneously, the other outer beam (not shown) is deflected first down and then up, and it also ends up being aligned with the center, or green beam 51.

Figure 7:
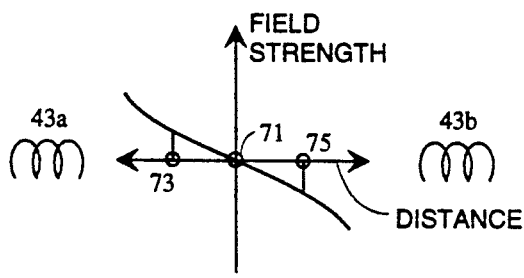
FIG. 7 is a graphic representation of the combined fields of one coil pair.

As shown in FIG. 4, the first or gunside coil pair 43 and the second or yoke side coil pair 45 are arranged along the neck on the side of the yoke 19 facing away from the screen 21. Each pair consists of two coils 43a, 43b, and 45a, 45b; one coil on each side of the neck 13. The gun side coil pair 43 is located proximal to the electron gun 11, while the yoke side coil pair 45 is located proximal to the yoke 19. The coil centers are substantially in the plane of the three inline beams. The two coils, e.g.. 43a 43b, of one pair produce equal and opposite magnetic fields 44a, 44b. Inside the neck, the fields from the two coils are super-imposed as shown in FIG. 7 in which the combined magnetic field of the gun side coil pair 43 is plotted against distance along the coils' common axis. The field is zero at the neck center 71 through which the green beam 51 passes, and it has equal but opposite intensity at points 73 and 75 which represent the centers of the red and blue beam, respectively.

The second coil pair 45 is spaced at a distance 59 along the neck 13 from the first coil pair 43 and proximal to the yoke 19. The second coil pair 45 is similar to the first coil pair 43, except for two differences: The direction of the fields 46a, 46b at corresponding points is reversed with respect to fields 44a, 44b, and their intensity is somewhat, e.g.. about 15%, greater because the outer beams must be redirected and not simply displaced to a parallel path. To simplify driving circuitry and ensure that the ratio and polarity of the fields produced by coil pairs 43 and 45 is always correct, it is preferred to connect the four coils in series so that the same current passes through all of them. The desired orientation and intensity ratio of the fields to maintain convergence and simultaneously correct eyebrow effect is then achieved by suitably choosing the number and direction of the turns in each coil. Field intensity may also be controlled by the choice of coil dimensions and of the mutual spacing 61 of the two coils which make up each pair. It is, of course, also possible to operate coil pairs 43 and 45 electrically in parallel, or from separate sources.

Figure 5:
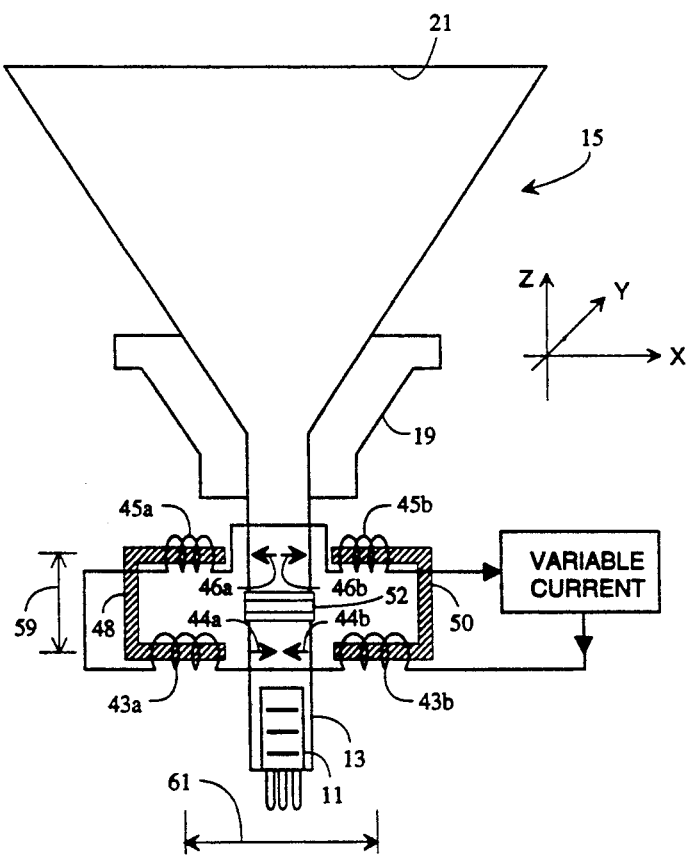
FIG. 5 is an alternative embodiment showing coils equipped with ferrite cores.

While plain coils are shown in FIG. 4, an alternative embodiment of FIG. 5 illustrates that coils containing high permeability cores may be used in one or both coil pairs to better utilize the limited space available on the neck. Because the fields produced by two coils on one side of the neck, e.g. 43a and 45a, are of opposite polarity, a first common core 48 may be used to link these two coils on the outside, and a second core 50 may analogously link coils 43b and 45b. As noted above, the required fields 46a and 46b are generally of an intensity different from fields 44a and 44b. The required intensity ratio may be obtained by the use of different numbers of turns, different core cross sections or different spacings between opposing cores. Permanent magnets 52 commonly used for correction of purity and convergence can be located on the neck 13 between the coil pairs 43, 45 as a further space saving expedient. All or some of the external neck apparatuses may be combined to form a unitary assembly.

Figure 6:
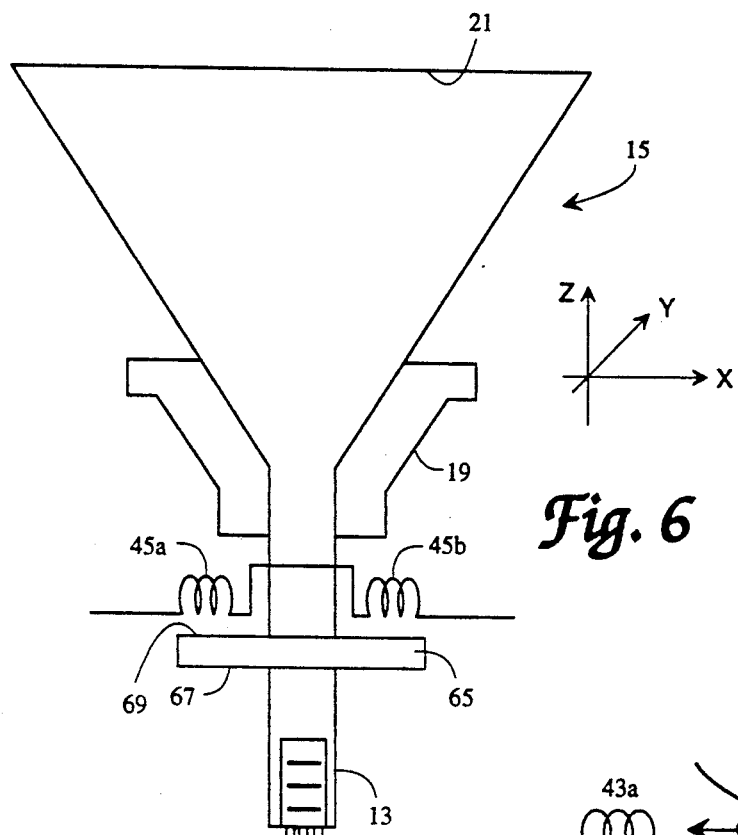
FIG. 6 is an alternative embodiment showing a first coil surrounding the neck followed by a coil pair.

As seen in FIG. 6 a coil 65 concentric to and surrounding the neck 13 may be substituted for the gun pair of coils in FIGS. 4 and 5. The concentric coil 65 will have equal magnetic field components on its upstream 67 and downstream 69 side, which provide first and second substantially equal but opposite deflections for each beam. Beam cross section distortion may be lessened by using the concentric coil. The yoke side coils 45a, 45b are retained to provide a final deflection of the beams to the proper angle for entry into the magnetic field of the yoke 19.

Figure 8:
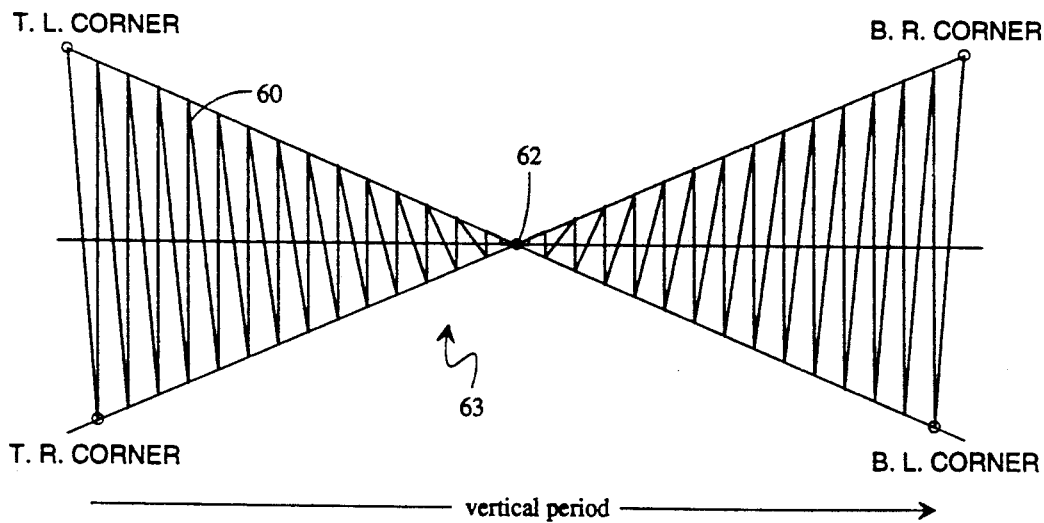
FIG. 8 illustrates a waveform for the current in the eyebrow effect canceling coils.
Figure 9:
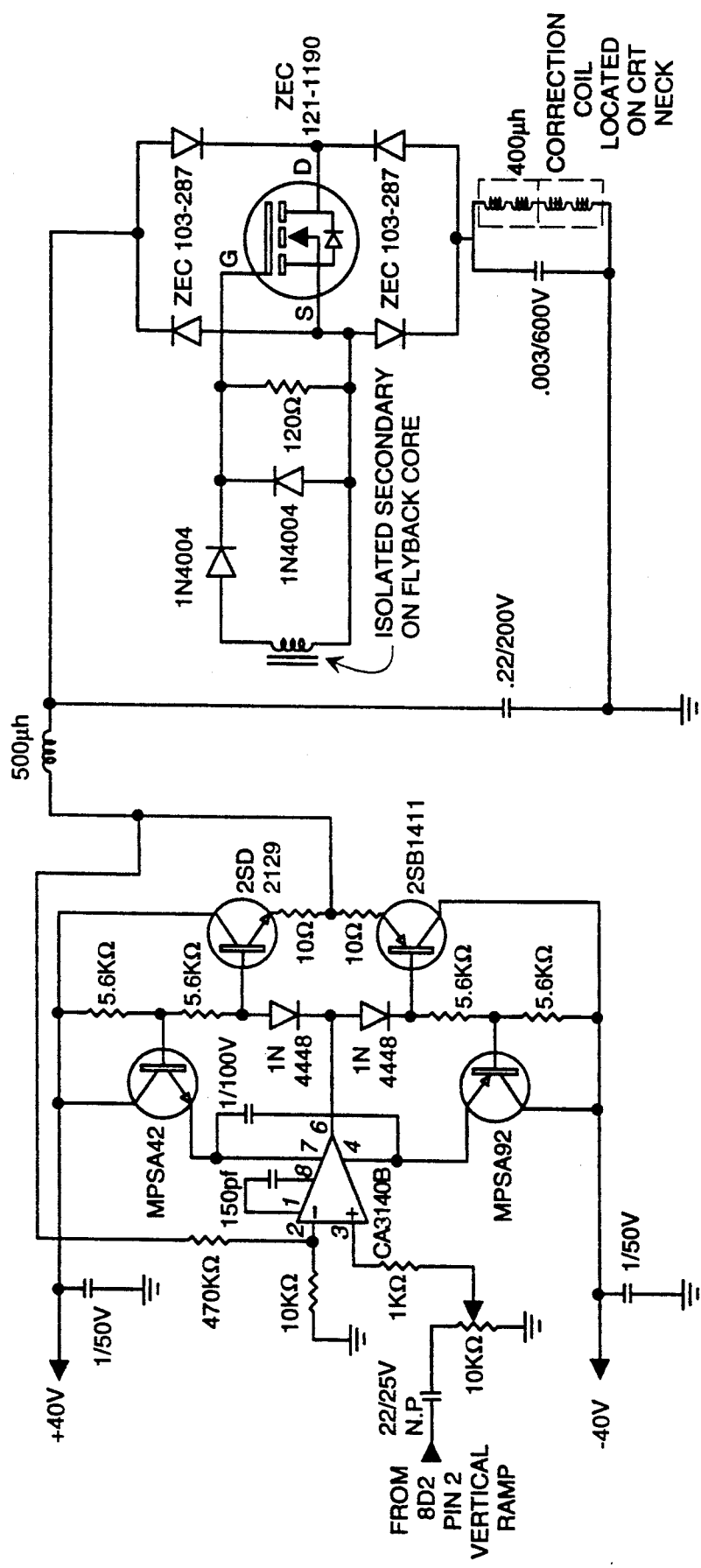
FIG. 9 illustrates a circuit for developing the waveform of FIG. 8.

As seen in FIG. 8, the current waveform 63 as supplied to the coils during one raster scan, or vertical period, has an envelope denominated as a "bow-tie." This waveform envelope is necessary due to the antisymmetrical nature of the eyebrow effect on the raster. That is, a sawtooth waveform 60 whose current goes from positive to negative during each horizontal scan line within the top half of the raster and from negative to positive during each horizontal scan line within the bottom half of the raster and which, synchronously with the raster scan, decreases in amplitude for each horizontal scan line until it reaches zero at the center point 62, and thereafter begins increasing in amplitude for each horizontal scan line until the end of the vertical scan. An example of circuitry constructed to carry out the present invention for a seventeen inch monitor type FTM tube is set forth by way of illustration in FIG. 9. Part numbers labeled "ZEC" are available from Zenith Electronics Corporation, the assignee of the present invention.

While the present invention has been illustrated and described in connection with the preferred embodiments, it is not to be limited to the particular structure shown, because many variations thereof will be evident to one skilled in the art and are intended to be encompassed in the present invention as set forth in the following claims:

Having thus described the invention, what is claimed is:

1. In a color CRT having a three beam inline electron gun and a deflection yoke for scanning the beams to create a raster, the yoke causing the CRT to exhibit eyebrow effect which is a purity distortion that is antisymmetrical on the raster and which varies in intensity over the raster,
   a method for correcting this purity distortion, comprising:
   a) placing magnetic field generators before the yoke of the CRT, and
   b) energizing the magnetic field generators synchronously with the raster scan to cancel the eyebrow effect distortion by dynamically predeflecting the beams before the yoke so as to counterbalance the eyebrow effect induced by the yoke.

2. In a color CRT having a three beam inline electron gun and a deflection yoke for scanning the beams to create a raster, the yoke causing the CRT to exhibit eyebrow effect which is a purity distortion that is antisymmetrical on the raster and which varies in intensity over the raster,
   an apparatus for correcting this purity distortion, comprising:
   a) magnetic field generators located before the yoke of the CRT, and
   b) means for energizing the magnetic field generators synchronously with the raster scan to cancel the eyebrow effect distortion by dynamically predeflecting the beams before the yoke so as to counterbalance the eyebrow effect induced by the yoke.

3. The apparatus of claim 2 wherein the magnetic field generators comprise electromagnetic coils.

4. The apparatus of claim 3 further comprising:
   a) first magnetic field generator coil surrounding the neck to provide first and second deflections to each of first and second outer electron beams; and
   b) a second magnetic field generator comprising a pair of coils to provide a third deflection to each of the first and second outer electron beams.

5. The apparatus of claim 2 wherein the magnetic field generators comprise a first field generator constructed and arranged to produce a magnetic field for deflecting first and second outer electron beams of the three in-line beams in opposite directions.

6. The apparatus of claim 5 further comprising a second field generator located beyond said first field generator and constructed and arranged to produce a magnetic field for deflecting the first and second outer electron beams in directions opposite said first field deflections for said outer electron beams.

7. The apparatus of claim 5 wherein the first and second magnetic field generators are constructed and arranged to generate magnetic fields of different strengths.

8. The apparatus of claim 5 wherein the means for energizing the magnetic field generators is constructed and arranged to energize the field generators to produce different strength fields.

9. An apparatus for correcting eyebrow effect purity distortion in a color CRT having: a longitudinal Z axis, an inline three beam type electron gun emitting a red electron beam, blue electron beam, and center green electron beam; a deflection yoke for scanning the electron beams to create a raster and having windings arranged to correct for pin cushion distortion, a screen, and a neck with an interior void for passing the electron beams from the electron gun to the field of the deflection yoke, the apparatus being located outside the neck and comprising:
   a) a gun side coil pair having a first coil located proximally to the red beam path and a second coil located proximally to the blue beam path, said first and second coils having substantially equal Z axis locations proximal to the electron gun;
   b) a yoke side coil pair having a third coil located proximally to the red beam path and a fourth coil located proximally to the blue beam path, the third and fourth coils having substantially equal Z-axis locations proximal to the yoke;
   c) current generating means connected to the coils for energizing the coils so as to:
      1) produce opposing magnetic fields of substantially equal strength, but opposite polarities in the first and second coils of the gun side pair, and substantially equal strength, but opposite polarities in the first and second coils of the gun side pair, and substantially equal strength, but opposite polarities in the third and fourth coils of the yoke side pair; said magnetic fields of each coil pair occurring in the neck interior void and substantially canceling each other in the green beam path of the interior void,
      2) vary each magnetic field in intensity and polarity during a single horizontal scan, and
      3) vary each magnetic field antisymetrically in polarity during a vertical raster scan, with the first and fourth coil fields, and the second and third coil fields being of like polarity at any given instant; whereby the beam paths are effectively displaced before entering the yoke to counter the dynamic electron-optic eyebrow effect distortion thereby causing substantially correct beamlet landings on the CRT screen during operation of the CRT.

10. The apparatus of claim 9 wherein the gun side and yoke side electromagnetic coils are constructed differently to produce a different strength in the first and second fields than in the third and fourth fields, while being connected in series and driven by one source of current.

11. The apparatus of claim 9 wherein at least some of the coils are spaced apart from the neck by different distances.

12. The apparatus of claim 9 wherein the means for energizing the coils is an electric circuit constructed and arranged to supply a sawtooth current waveform which goes from positive to negative for each horizontal scan line on the top half of the raster and from negative to positive for each horizontal scan line on the bottom half of the raster and which, synchronously with the raster scan, decreases in amplitude for each horizontal scan line until the centerpoint, and thereafter begins increasing for each horizontal scan line in amplitude until the end of the vertical scan.

13. The apparatus of claim 9 wherein the coils have high permeability cores.

14. The apparatus of claim 13 wherein the first and third coils share a common core and the second and fourth coils have a common core.

* * * * *